United States Patent
Ohoka et al.

(10) Patent No.: US 9,481,398 B2
(45) Date of Patent: Nov. 1, 2016

(54) DAMPER HOUSING STRUCTURE BODY AND DAMPER HOUSING STRUCTURE BODY FABRICATION METHOD

(71) Applicant: HONDA MOTOR CO., LTD., Tokyo (JP)

(72) Inventors: Hisayasu Ohoka, Saitama (JP); Atsushi Suzuki, Saitama (JP); Mitsushige Goto, Saitama (JP); Keita Ohtsuka, Saitama (JP); Taichi Nezasa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/403,443

(22) PCT Filed: May 24, 2013

(86) PCT No.: PCT/JP2013/064455
§ 371 (c)(1),
(2) Date: Nov. 24, 2014

(87) PCT Pub. No.: WO2013/180025
PCT Pub. Date: Dec. 5, 2013

(65) Prior Publication Data
US 2015/0166117 A1 Jun. 18, 2015

(30) Foreign Application Priority Data

May 29, 2012 (JP) ................................. 2012-122174

(51) Int. Cl.
B62D 25/08 (2006.01)
B23K 11/24 (2006.01)
(Continued)

(52) U.S. Cl.
CPC ............ B62D 25/088 (2013.01); B23K 11/00 (2013.01); B23K 11/115 (2013.01); B23K 11/24 (2013.01);
(Continued)

(58) Field of Classification Search
CPC ..... B23K 11/00; B23K 11/115; B23K 11/24; B23K 2201/006; B23K 2201/18; B23K 2203/04; B62D 25/08; B62D 25/082; B62D 25/088

USPC ................................ 296/193.09, 187.09, 192
See application file for complete search history.

(56) References Cited

U.S. PATENT DOCUMENTS 4,542,934 A 9/1985 Komatsu et al.
7,828,330 B2 * 11/2010 Tamura ................ B62D 25/088
280/124.109

(Continued)

FOREIGN PATENT DOCUMENTS

DE 10 2009 032 602 7/2009
JP H07-37903 U 7/1995
(Continued)

OTHER PUBLICATIONS

International Search Report, Date of Mailing: Jul. 30, 2013.
(Continued)

Primary Examiner — Joseph D Pape
Assistant Examiner — Dana Ivey
(74) Attorney, Agent, or Firm — Rankin, Hill & Clark LLP

(57) ABSTRACT

In a damper housing structure body, an upper edge of a damper housing and a damper base are bonded by spot welding. The damper housing has a U-shape with an opening on a vehicle outer side in plan view, and includes a planar part in a corner between a front wall and an inner wall. The planer part includes plural welding spots arranged in the front-rear direction of the vehicle. Adjacent weld spots have mutually overlapping welding margins or an interval between two adjoining welding points is shorter than an outer diameter of the welding margins. One of the welding spots is welded while a current is applied to another welding spot that has been already welded. A current value for welding the one of the welding spots is higher than another current value for another one of the welding spots that has been already welded.

10 Claims, 5 Drawing Sheets

(51) Int. Cl.
 B23K 11/11 (2006.01)
 B23K 11/00 (2006.01)

(52) U.S. Cl.
 CPC ............ B62D 25/08 (2013.01); B62D 25/082 (2013.01); *B23K 2201/006* (2013.01); *B23K 2201/18* (2013.01); *B23K 2203/04* (2013.01)

(56) References Cited

U.S. PATENT DOCUMENTS

2011/0316308 A1\* 12/2011 Matsuoka ............ B62D 25/088 296/192

2012/0242111 A1 9/2012 Mildner et al.

FOREIGN PATENT DOCUMENTS

| | | |
|---|---|---|
| JP | 07-232279 | 9/1995 |
| JP | 2000-016338 | 1/2000 |
| JP | 2004-276789 | 10/2004 |
| JP | 2005-067490 | 3/2005 |
| JP | 2006-056489 | 3/2006 |
| JP | 2007-284008 | 11/2007 |
| JP | 2009-292226 | 12/2009 |

OTHER PUBLICATIONS

European Search Report dated Mar. 21, 2016.

\* cited by examiner

DAMPER HOUSING STRUCTURE BODY AND DAMPER HOUSING STRUCTURE BODY FABRICATION METHOD

TECHNICAL FIELD

The present invention relates to a damper housing structure body and a damper housing structure body fabrication method in a vehicle.

BACKGROUND ART

Suspension devices (suspensions) for a vehicle installed on both sides in an engine room are supported through damper bases which are supported by damper housings which are located at top surfaces of the housings (see Patent Document 1). The damper base and the damper housing are subject to loads during travelling. Particularly, during traveling on a rough road, an excessive load is inputted thereto. Accordingly, a considerable bonding strength is required.

The damper base is joined with the upper edge of the damper housing by spot welding. It is known that the load during travelling is concentrated at a front corner of the upper edge of the damper housing having a U-shape in a plan view. This part cannot be welded for joining, so that it is difficult to secure the bonding strength by the spot welding. Accordingly, a necessary strength is secured by reinforcement with another member, an increase in a plate thickness, a modification of a shape of the damper base, etc (see Patent documents 2, 3, and 4).

PRIOR ART

Patent Document

PATENT DOCUMENT 1; JP 2006-56489 A
PATENT DOCUMENT 2; JP 2009-292226 A
PATENT DOCUMENT 3; JP 2004-276789 A
PATENT DOCUMENT 4; JP 2007-284008 A

SUMMARY OF INVENTION

Problem to be Solved by Invention

However, in the technologies described in Patent Documents 2, 3, and 4, there are problems in increase in weight resulting from reinforcement with another member, increase in thickness of plate members, or increase in weight resulting from improvement of a shape of the damper base, and increase in a man-hour resulting from reinforcement with another member.

The present invention has been developed in consideration of the circumferences described above and aims to provide a damper housing structure body and a damper housing structure body fabrication method in which a damper housing and a damper base are secured in a bonding strength with avoidance of increase in the weight and man-hour.

Problem to be Solved by Invention

To solve the above-described problems, the present invention is characterized in that;
a damper housing configured to house a damper of a suspension device of a vehicle; and
a damper base, disposed at a top of the damper housing, fixed to the damper, wherein
an upper edge of the damper housing and the damper base are bonded by spot welding, wherein
the damper housing having a U-shape in a plan view thereof with an opening toward a vehicle outer side and including a planar part at a corner part between a front wall and an inner wall thereof, wherein
the planar part includes a plurality of welding spots arranged in a vehicle front-rear direction, and wherein
the welding spots adjoining each other have welding margins which are overlapped each other.

To solve the above-described problems, the present invention is characterized in that
a damper housing configured to house a damper of a suspension device of a vehicle; and
a damper base, disposed at a top of the damper housing, fixed to the damper, wherein
an upper edge of the damper housing and the damper base are welded by spot welding, wherein
the damper housing having a U-shape in a plan view thereof with an opening toward a vehicle outer side and including a planar part at a corner part between a front wall and an inner wall, wherein the planar part includes a plurality of welding spots arranged in a vehicle front-rear direction, and wherein
an interval between two of the welding spots adjoining each other is shorter than an outer diameter of the welding margin.

According to the above-described structure, the spot welding is carried out at a plurality of spots at a narrow interval at a planar part at a corner part between the inner wall and the front wall of the damper housing, which was conventionally difficult. Accordingly, the strength capable of bearing the travelling load at the damper housing can be provided. Further, it becomes possible to reduce a plate thickness of the damper housing because of the increased strength, which provides a weight saving and a cost reduction of the vehicle body. Further, a properly distributing a plurality of welding spots can decrease the number of total impact spots, which provides reductions in cost and in man-hours. Further, a ridge line between the front wall and the planar part and a ridge line between the inner wall and the planar part appropriately disperse the travelling load applied to the damper housing from a downward direction, so that a concentration of the load can be avoided.

Another configuration may be provided in which one of the welding spots is welded while a current is also applied to other welding spots having been already welded.

According to this configuration, a plurality of welding spots are not formed instantaneously but sequentially formed. When one welding spot is formed by welding, bonding is provided while currents are applied to other welding spots which have been already formed. Accordingly, a plurality of welding spots can be formed at a narrow part, which was conventionally difficult, so that a strength enough to stand the travelling load in the damper housing can be provided. Further, increase in the strength can reduce a thickness of the damper housing 2, so that weight saving and cost reduction for the vehicle body can be provided. Further, appropriate allocation of a plurality of welding spots can reduce the total number of spots, which provides reduction in cost and in the man-hours.

It is desirable that a current value for the one of the welding spots for welding is higher than a current value for another one of the welding spots that has been already welded.

According to this structure, when the one of the welding spots is formed, the current value for the one of the welding spots is higher than the current value for the welded spot that has been already formed. Accordingly, a plurality of welding spots can be provided at the narrow space, which has been difficult. Thus, the strength enough to stand the travelling load can be secured. Further, the increased strength makes it possible to reduce the plate thickness in the damper housing, which provides weight saving and cost reduction of the vehicle body. Further, appropriate allocation of the welding spots results in the total number of impact spots, which provides advantageous effects in the cost reduction and reduction in man-hours.

The width of the planar part may be substantially the same as a sum of outer diameters of a plurality of the welding spots.

According to the structure, because the width of the planar part is substantially the same as the sum of outer diameters of a plurality of the welding spots, the stiffness enough to stand the travelling load in the damper housing can be provided. Further, the increased strength makes it possible to reduce the plate thickness in the damper housing, which provides weight saving and cost reduction of the vehicle body. Further, appropriate allocation of the welding spots results in decrease in the total number of impact spots, which provides advantageous effects in the cost reduction and reduction in man-hours.

To solve the above-described problems, the present invention provides a damper housing structure body fabrication method of producing a damper housing structure body including: a damper housing configured to house a damper of a suspension device of a vehicle; and a damper base, disposed at a top of the damper housing, fixed to the damper, the method comprises:

the damper housing has a U-shape in a plan view thereof with an opening toward a vehicle outer side and include a planar part at a corner part between a front wall and an inner wall; and performing spot welding at a plurality of welding points arranged in a front-rear direction of a vehicle, wherein the welding points adjoining each other having welding margins which are overlapped each other or an interval between two adjoining welding points is shorter than an outer diameter of the welding margins.

Accordingly, the one of the welding spots can be formed by applying a current also to the welding spot that has been already formed.

It is desirable that the one of the welding spots is welded at a current which is higher than another current value for another one of the welding spots that has been already welded.

Advantageous Effect of Invention

According to the present invention, a joint strength between the damper housing and a damper base can be secured while increase in weight and the number of man-hours are avoided.

BRIEF DESCRIPTION OF DRAWINGS

FIGS. 4A to 4E are drawings illustrating bonding between the damper housing and the damper base in which FIG. 4A is a perspective view showing the damper housing and the damper base, FIG. 4B is an enlarged view showing a part A1 in FIG. 4A, FIG. 4C is a plan view showing the damper housing and the damper base, and FIG. 4D is an enlarged view showing a part A2 in FIG. 4C, and FIG. 4E is a cross section view taken along A3 in FIG. 4D.

FIG. 5B is a drawing showing an expanded status of division currents, and FIG. 5C shows a decreasing status of the division currents.

MODES FOR CARRYING OUT INVENTION

Embodiments of the present invention are described with reference to FIGS. 1 to 5C in which the damper housing structure body according to the present invention is applied to a vehicle front structure, is exemplified. In explanation, the same element is designated with the same reference, and a duplicated explanation is omitted. When a direction is explained, the explanation is made on the basis of front-rear, left-right, and up-down viewed by the driver of the vehicle. In addition, a vehicle width direction is equal in meaning to a left-right direction.

Figure 1:
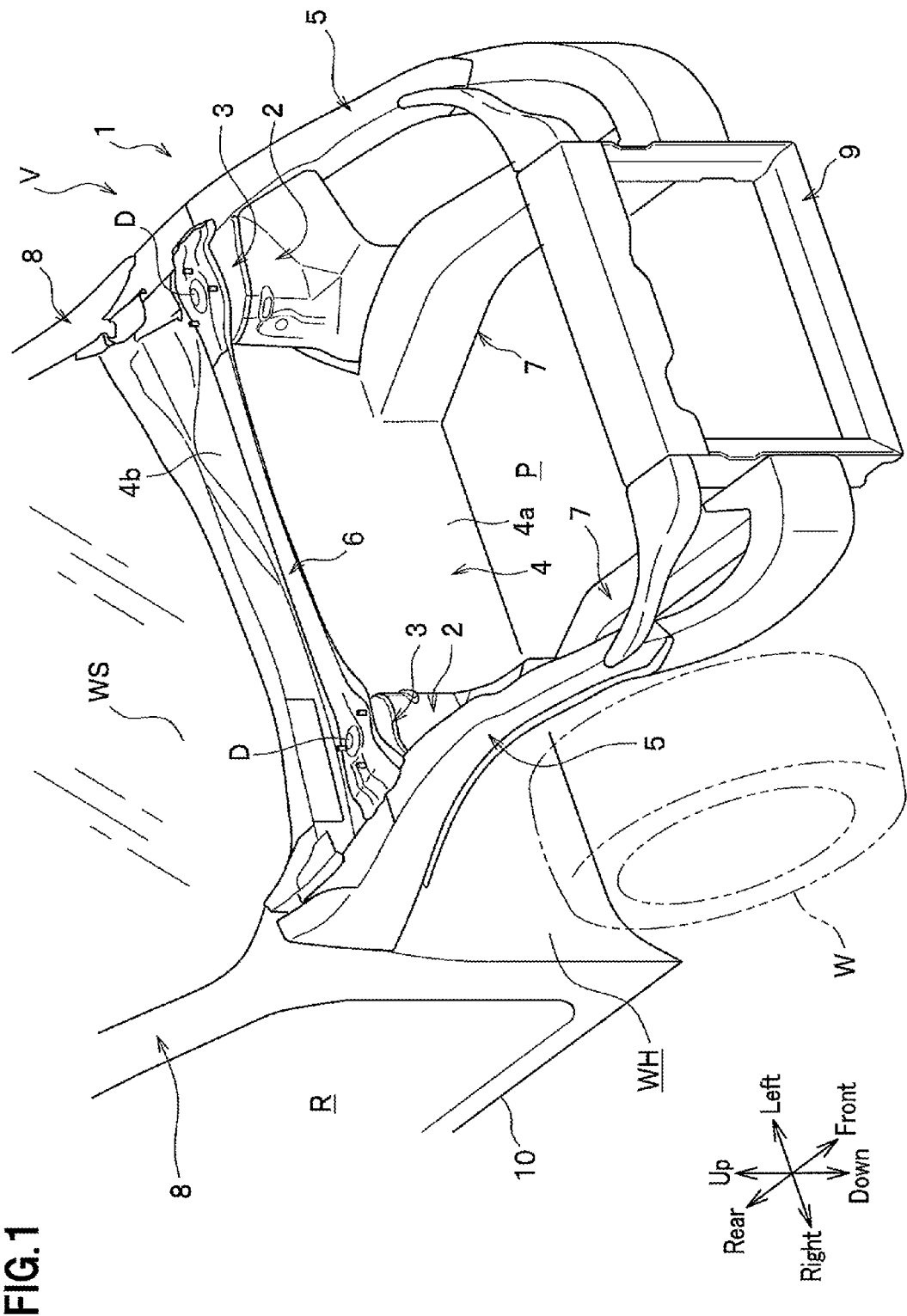
FIG. 1 is a perspective view showing a vehicle including a damper housing structure body according to embodiments of the present invention.

FIG. 1 is a perspective view of a vehicle front structure of a vehicle including a damper housing structure body according to the embodiment of the present invention when downwardly viewed from a front diagonally right. As shown in FIG. 1, a vehicle V is an automobile includes a power unit mounting chamber P for housing a power unit such as an engine, a vehicle carbine R for providing a space for crews, and wheel houses WH for housing front wheels W. A vehicle front structure 1 according to the embodiment is a structure around a damper housing structure body 1 including damper housings 2 and a damper base 3, provided on both left and right sides of the power unit mounting chamber P.

The damper housing structure body 1 mainly includes a pair of left and right damper housings 2, the damper bases 3 provided at upper parts of the damper housings 2, a dash board 4 for partition between the power unit mounting chamber P and the vehicle cabin R, a pair of upper members 5 extending in a vehicle front-rear direction on the left and right sides of the power unit mounting chamber P, and a stiffener 6 bridging between the left and right damper housings 2. Further, the vehicle V includes a pair of left and right front side frames 7, a pair of left and right front pillars 8, a front bulkhead 9, a pair of left and right side sills 10, and a pair of fenders 11 (see FIG. 2), etc.

The upper member 5 is a frame member having a hollow-cross-section structure, extending in the vehicle front-rear direction. The upper member 5 is curved such that the nearer to the front of the vehicle the part thereof is located, the more downwardly the part positions. A front end of the upper member 5 is divided into two divisions in a vertical direction which are connected to the front bulkhead 9. A rear end of the upper member 5 is connected to the front pillar 8. Further, on an outer side of the vehicle V, the fender 11 is provided being connected to the vehicle V each other using bolts (not shown).

The dash board 4 is a steel plate member for partitioning between the power unit mounting chamber P and the vehicle cabin R. The dash board 4 includes two members, that is, a dash board lower 4a on a lower side thereof, and a dash board upper 4b on an upper side thereof. The dash board lower 4a is bridged between the left and right front pillars 8. The dash board upper 4b is bridged between rear ends of the left and right upper members 5.

The front side frame 7 is a frame member having a hollow cross section structure provided under the upper member 5 extending in the vehicle front-rear direction. A front end of the front side frame 7 is connected to the front bulkhead 9 and a rear end of the front side frame 7 is connected to a lower end side of the dash board lower 4a.

The front pillar 8 is a frame member having a hollow cross sectional structure that supports left and right ends of a front wind shield WS and left and right ends of the dash board lower 4a. Lower ends of the front pillars 8 are connected to front ends of a pair of the side sills 10 disposed on left and right ends of the vehicle cabin R extending in vehicle front-rear direction.

Figure 2:
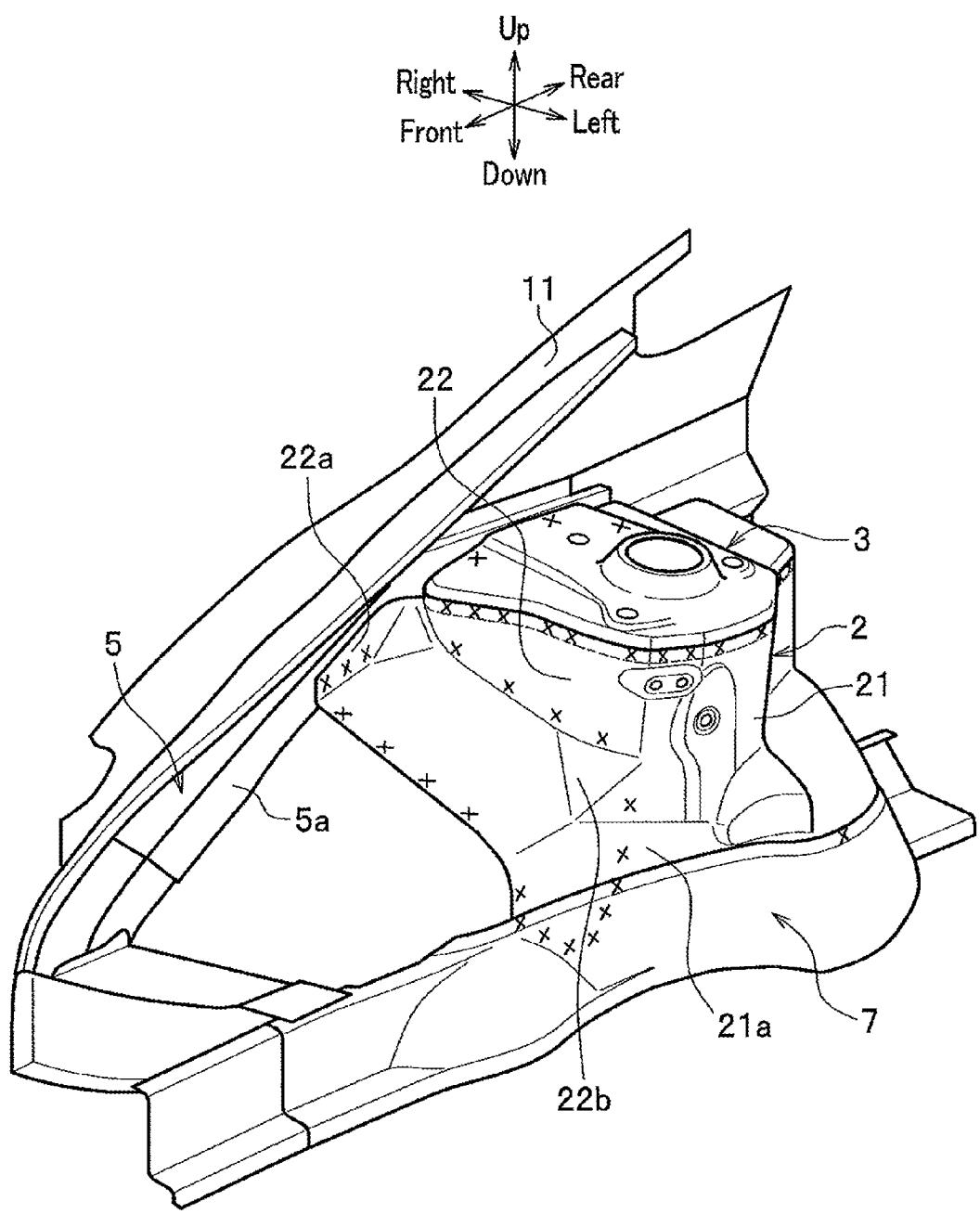
FIG. 2 is an enlarged perspective view showing a damper housing structure body.

FIG. 2 is an enlarged perspective view showing a damper housing structure body. Because the damper housings 2 and the damper bases 3 have a left-right symmetrical structure, only the damper housing 2 and the damper base 3 on the right side are described and descriptions about the damper housing 2 and the damper base 3 on the left side are omitted. In FIG. 2, marks x indicate points welded by spot welding.

As shown in FIG. 2, the damper housing 2 is a steel member housing a damper D (see FIG. 3) and form side walls on the left and right side of the power unit mounting chamber P. The damper housing 2 includes an inner side wall (inner wall part) 21, a front side wall (front wall part) 22, and a rear side wall 23 (see FIG. 3) and has a substantially U-shape in a plan view. The damper base 3 is fixed to an upper part of the damper housing 2 by welding. The inner wall 21 is, at a lower end 21a thereof, connected to the front side frame 7. On outside end parts of the front side wall 22 and the rear side wall 23, flanges are formed (only a flange 22a of the front side wall 22 is shown) and connected to a vehicle inside surface 5a of the upper member 5. Lower ends of the front side wall 22 and the rear side wall 23 are formed in a substantially arc in which the nearer to the inner wall 21a part thereof is, the lower the part of the arc is positioned.

A wheel house front 25 is formed integrally with a lower end part 22b of the front side wall 22. The wheel house front 25 curves in a substantially arc shape of which an end on a vehicle outer side is connected to the upper member 5, and an end on a vehicle inner side is connected to the front side frame 7. Further, at a lower end 23b of the rear side wall 23 a damper housing extension 26 is formed integrally. The damper housing extension 26 curves in a substantially arc shape in which an end on the vehicle outer side is connected to the damper base 3, and an end on the vehicle inner side is connected to the front side frame 7. Further, a rear end of the damper housing extension 26 is connected to the dash board lower 4a. The wheel house front 25 and the damper housing extension 26 form an upper surface of a wheel house WH.

In the present invention, the damper housing 2 includes a planar part 24 at a corner part between the inner wall 21 and the front side wall 22. The planar part 24 is a seat face receiving a large load during travel of the vehicle V that is formed slantwise relative to the inner wall 21 and the front side wall 22.

Figure 3:
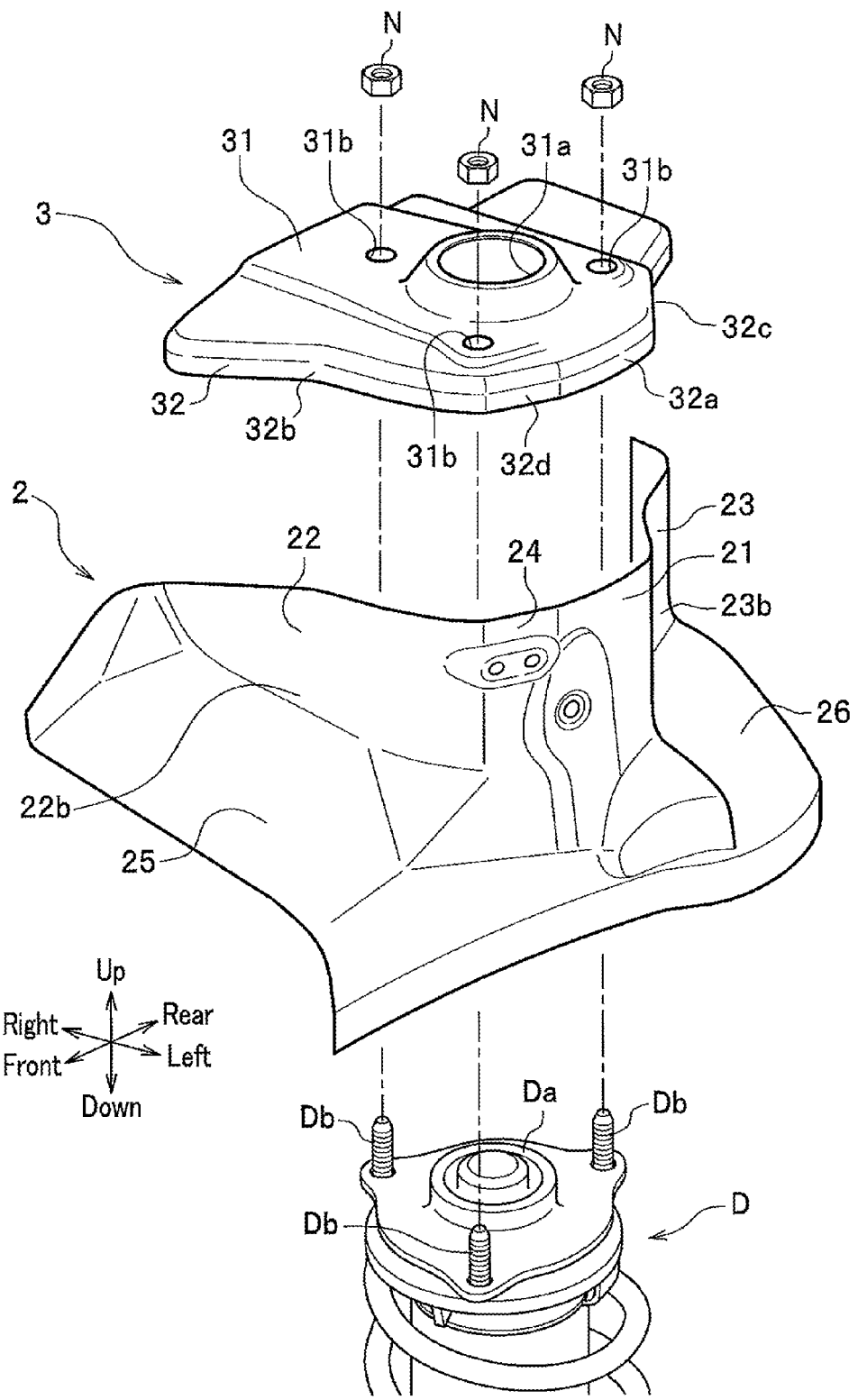
FIG. 3 is an exploded perspective view showing a damper housing and a damper base.

FIG. 3 is an exploded perspective view showing a damper housing and a damper base. As shown in FIG. 3, the damper base 3 is fixed to an upper part of the damper housing 2 which forms a top part of the damper housing 2, and a steel member having disk shape. The damper base 3 is formed independently from the damper housing 2 and formed to have a thickness larger than that of the damper housing 2. The damper base 3 includes a damper base upper wall 31 to which the damper D is installed, a damper base side wall 32 fixed to the damper housing 2.

Because the damper base 3 and the damper housing 2 are formed separately, only a thickness of the damper base 3 receiving a large load such as the load during travel is increased to prevent a thickness of the damper housing 2 from increasing, so that an increase in weight can be suppressed.

At a middle of the damper base upper wall 31, an opening 31a is formed to allow a protrusion Da in a circular hollow cylindrical shape provided on a top of the damper D to penetrate therethrough. The damper base upper wall 31 includes three damper fixing parts 31b around the opening 31a.

As shown in FIG. 3, the damper fixing part 31b is a through hole for allowing bolts Db provided on a top of the damper D to penetrate therethrough. The three damper fixing parts 31b are arranged such that imaginary lines connecting the damper fixing parts 31b form an equilateral triangle.

The damper base side wall 32 is a part connected to an upper edge of the inner wall 21 by spot welding and includes an inner side wall (inner wall) 32a, a front side wall (front wall) 32b, and a rear side wall 32c, a planar part 32d formed at a corner part between the inner side wall 32a and the front side wall 32b and has a shape overlapped with an vehicle outer side surface of the upper end of the inner wall 21.

Figure 4A:
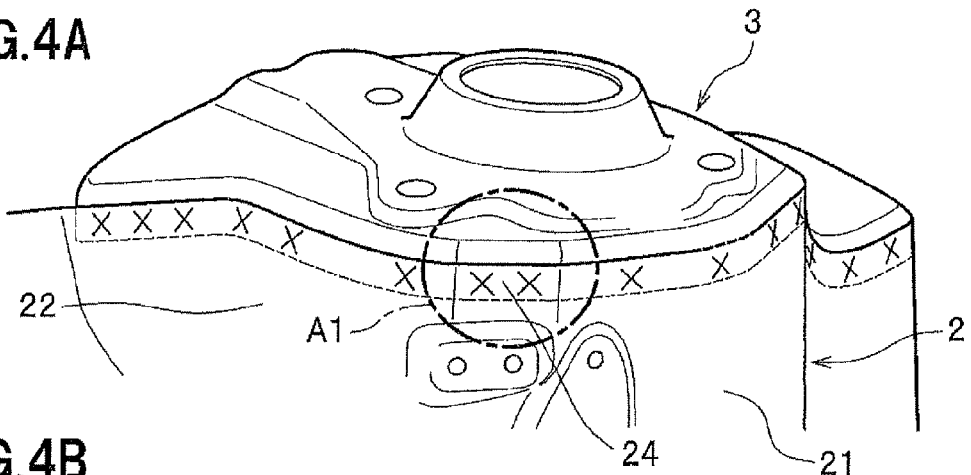
Figure 4B:
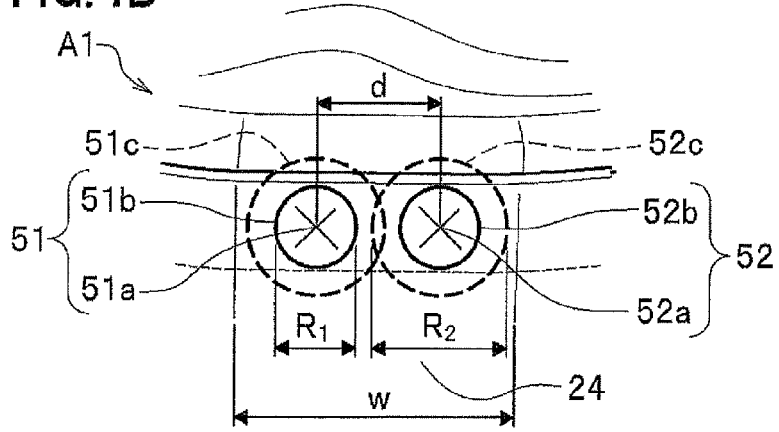
Figure 4C:
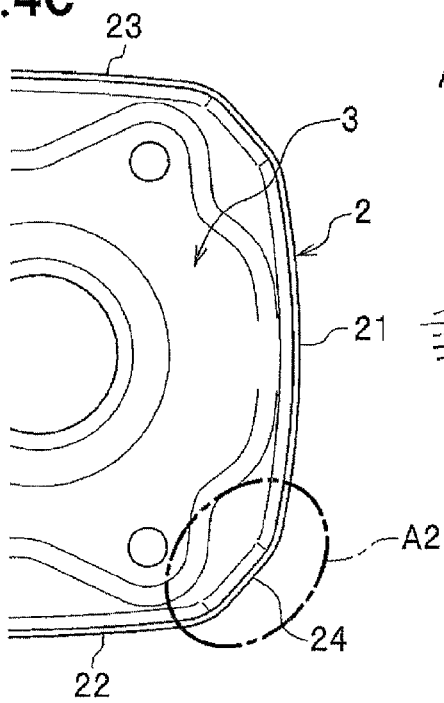
Figure 4D:
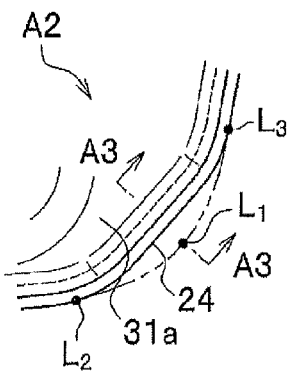
Figure 4E:
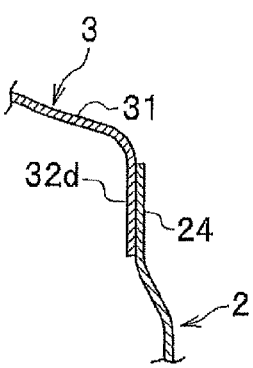

FIGS. 4A to 4C are drawings illustrating bonding between the damper housing and the damper base in which FIG. 4A is a perspective view showing the damper housing and the damper base, FIG. 4B is an enlarged view showing a part A1 in FIG. 4A, FIG. 4C is a plan view showing the damper housing and the damper base, and FIG. 4D is an enlarged view showing a part A2 in FIG. 4C, and FIG. 4E is a cross section view taken along line A3 in FIG. 4D.

As shown in FIGS. 4C to 4E, the upper edge of the damper housing 2 and the damper base side wall 32 are connected by spot welding in an overlapped status each other. As shown in FIG. 4A, there are a plurality of joint points (X mark) by spot-welding at the inner wall 21, the front side wall 22, and the rear side wall 23, and in the planar part 24, there are a plurality of the joint points (in this embodiment, there are two spots).

As shown in FIG. 4B, joint points, i.e., welding spots 51, 52 formed by the spot welding at the planar part 24 are arranged in a front-rear direction of the vehicle V. The welding spot 51 previously weld includes a welding center (spot hitting point) 51a and a welding part (nugget) 51b having a circular shape with a diameter $R_1$ viewed from the welding gun 61 (see FIG. 5) which is actually joined by welding on the center of the welding center 51a. Around the welding spot 51, there is a welding margin 51c having a disk plate shape with an outer diameter $R_2(R_2>R_1)$ around the welding center 51a as a center. In other words, there is the welding margin 51c having the disk plate shape having the outer diameter $R_2$ and the inner diameter $R_1$ viewed from the welding gun 61. The welding spot 52 joined later includes a welding center (spot hitting point) 52a and a welding part (nugget) 52b having a circular shape with a diameter $R_1$ viewed from the welding gun 61 which is actually joined by welding on the center of the welding center 52a. Around the welding spot 52, there is a welding margin 52c having the outer diameter $R_2(R_2>R_1)$ around the welding center 52a as a center. In other words, there is the welding margin 52c having a disk plate shape having the outer diameter $R_2$ and the inner diameter $R_1$ viewed from the welding gun 61. An outer diameter $R_1$ of the welding parts (nuggets) 51b, 52b varies such that the thicker the thickness is, the larger the outer diameter $R_1$ is. As defined in JIS, when a plate thickness is assumed as $t_4$, the outer diameter $R_1$ is generally $4\sqrt{t_4}$. Further, the outer diameter $R_2$ of the welding margins 51c, 52c are generally able to be set to twice the outer diameter (diameter of an electrical diameter) of the welding gun 61.

In the embodiment, the adjoining the welding spots 51, 52 are arranged such that the welding margin 51c is overlapped with the welding margin 52c. In other words, an interval d between the welding centers the welding centers 51a, 52a of the welding spots 51, 52 adjoining each other is shorter than the outer diameter $R_2$ of the welding margins 51c, 52c, i.e., the welding margin outer diameter $R_2$, and the welding spots 51, 52 adjoining each other are arranged so as to satisfy the following equation.

$$R_1 < d < R_2$$

More specifically, the interval d between the welding centers 51a, 52a adjoining each other is set so that the welding parts (nugget) 51b, 52b are not overlapped and the welding margins 51c, 52c are overlapped each other.

Further, it is desirable that a width w of the planar part 24 (equal to a width of the planar part 32d) is substantially the same as outer diameter of the welding margins 51c, 52c of a plurality of the welding spots 51, 52, i.e., a sum of the welding margin outer diameters $R_2$.

$$W \approx 2R_2$$

Further, as long as a bonding strength by welding is secured, it is allowed that the width w of the planar part 24 is larger than the sum of the outer diameters of the welding margins 51c, 52c of a plurality of the welding spots 51, 52.

In the embodiment, the two welding spots 51, 52 are arranged so as to pinch a ridgeline L1 (see FIG. 4D) when the corner part between the inner wall 21 and the front side wall 22 shows a curved shape. In other words, the two welding spots 51, 52 are arranged to pinch a center in a width direction of the planar part 24.

Figure 5A:
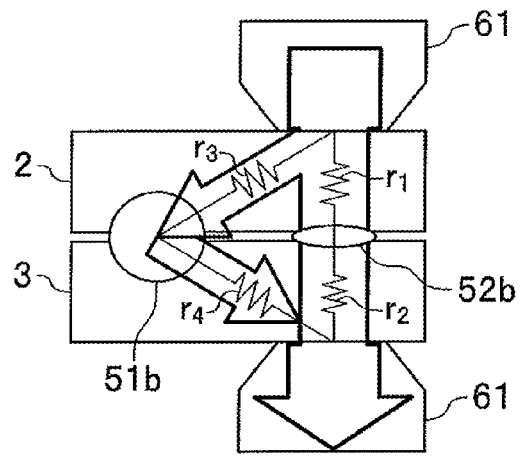
FIGS. 5A to 5C are drawing illustrating a welding method for welding at welding spots on a plain part, in which FIG. 5A showing an initial stage of current application.
Figure 5B:
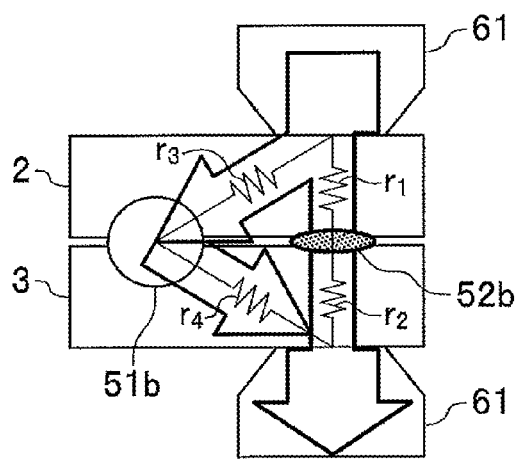
Figure 5C:
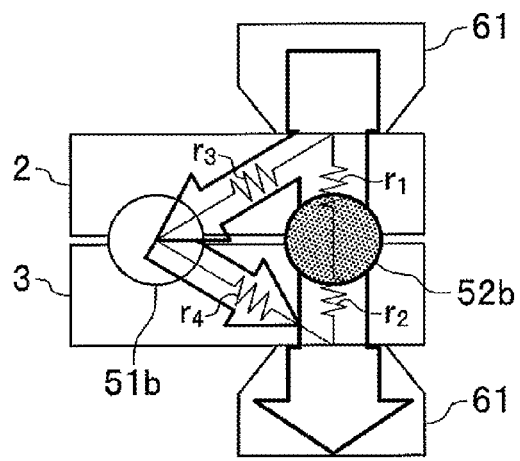

Next, a method of producing the damper housing structure body according to the embodiment of the present invention, particularly, a method of welding the welding spots 51, 52 at the planar part 24 is mainly described with reference to FIGS. 5A to 5C. FIGS. 5A to 5C are drawings illustrating a welding method at a welding spot at the planar part in which FIG. 5A shows a status of a current conduction initial stage, FIG. 5B shows a status in which division currents are expanded, and FIG. 5C shows a status in which the division current decreased.

A joule heat Q upon welding is expressed by the following equation.

$$Q = 0.24 \cdot I^2 \cdot r \cdot t$$

where I: Current, r: resistance, and t: current application period.

When the welding spots 51, 52 are sequentially formed, i.e., after formation of the welding spot 51, a welding spot 52 is formed, a shunt current is generated at the welding spot 51 when the welding spot 52 is formed, so that a current flowing in the welding spot 52 decreases. Accordingly, to cover the shunt current, it is necessary that the current I in the Joule heat equation is increased or a current conduction period t is extended. However, it is possible that extension of the current conduction period t makes a diameter of the nugget (current conduction diameter) large. However, because this influences an operation period, in the present embodiment, an appropriate diameter is provided by adjusting a value of the current I.

First, as shown in FIG. 5A, in a status in which the welding part 51b is formed by previously welding the welding spot 51, a pair of the welding guns 61, 61 are arranged so as to pinch a welding center 52a of the welding spot 52, and a current application is carried out for spot welding. The current value for the spot welding at the welding spot 52 can be set to a value higher than the current value for spot welding at the welding spot 51 which has been previously welded. This is a counter means in consideration of occurrence of the shunt current at the welding spot 51 upon welding the welding spot 52.

More specifically, as shown in FIG. 5A, at the current conduction initial stage, in addition to the current forming a welding part 52b via a resistor $r_1$ on the side of the damper housing 2 and a resistor $r_2$ on a side of the damper base 3, a shunt current on a side of the nugget 51b via a resistor $r_3$ on the side of the damper housing 2 and a resistor $r_4$ on a side of the damper base 3 occur.

As shown in FIG. 5B, when heat is generated by the current conduction at the welding part 52b, resistances of the resistors $r_1$ and $r_2$ increase, so that a value of a current flowing through the welding part 52b decreases, so that a current value of the shunt current increases.

Next, as shown in FIG. 5C, when the welding part 52b is expanded by current conduction, this decreases the resistors $r_1$, $r_2$, and a value of a current flowing through the 52b increases, so that a current value of the shunt current decreases.

The current value upon bonding at the welding spot 52 depends on materials of the damper housing 2 and the damper base 3. However, for example, the current value is set to a value higher than the current value at the welding spot 51 by about 500 to 1500 A. When an increase in the current value from the current value upon welding the welding spot 51 is less than 500 A, the shunt current to the welding spot 51 becomes large, so that there may be a case where an appropriate nugget diameter at the welding spot 52 may not be secured. In addition, the increase from the current value upon welding the welding spot 51 exceeds 1500 A, spatter is generated to a considerable extent at the current conduction initial stage, so that the resistors $r_1$, $r_2$ decrease, which may not secure an appropriate value of nugget's outer diameter $R_1$ at the welding spot 52.

In the damper housing structure body according to the embodiment of the present invention, the spot welding is carried out at the planar part 24 at the corner part between the inner wall 21 and the front side wall 22 of the damper housing 2 at a narrow interval. Accordingly, it becomes possible to provide the welding spots 51, 52 at a narrow space part, which was conventionally difficult, so that a strength enough to stand the travelling load in the damper housing 2 can be secured. Further, an increased strength can reduce the plate thickness of the damper housing 2, so that weight saving of the vehicle body and cost reduction can be provided. Further, a plurality of the welding spots 51, 52 are properly distributed, which decreases a total number of the impacts, so that advantageous effects in cost reduction and decrease in man-hour can be provided. Further, a ridge line L2 between the front side wall 22 and the planar part 24 and a ridge line L3 between the inner wall 21 and the planar part 24 appropriately disperse the traveling load inputted into the damper housing 2 from a downward direction to avoid load concentration.

In the damper housing structure body according to the embodiment of the present invention, a plurality of the welding spots 51, 52 are not formed instantaneously, but sequentially formed, so that when one of the welding spots 52 is weld, currents are conducted at other welding spots 51 which have been formed to provide joint at a plurality of welding spots. Accordingly, it becomes possible to provide the welding spots 51, 52 at the narrow space part, which was conventionally difficult, so that the strength to sand the travelling load can be secured in the damper housing 2. Further, an increased strength can reduce a plate thickens of the damper housing 2, which results in weight saving and cost reduction of the vehicle body. Further, a proper allocation of the welding spots 51, 52 can decrease the total number of the impacts, which provides cost reduction and decrease in man-hours.

Further, in the damper housing structure body according to the embodiment of the present invention, when one of the welding spots 52 is welded, the welding spot 52 is welded with a current having a value higher than currents for welding other the welding spots 51. Accordingly, the welding spots 51, 52 can be provided appropriately at the narrow part, which was conventionally difficult to be welded, so that the damper housing 2 is provided with the strength enough to stand the travelling load. Further, the increased strength makes it possible to reduce the plate thickens in the damper housing 2, so that weight saving and cost reduction are provided. Further, the total impact spots can be reduced in the number, so that cost reduction and reduction in man-hour are provided by appropriately allocation of the welding spots 51, 52.

Further, in the damper housing structure body according to the embodiment of the present invention, because the width of the planar part 24 is substantially the same as the sum of outer diameters of the welding margins, the damper housing 2 can have the strength to sand the travelling load. Further, the increased strength makes it possible to reduce the plate thickness in the damper housing 2, which provides weight saving and cost reduction of the vehicle body. Further, appropriate allocation of the welding spots 51, 52 results in the total number of impact spots, which provides advantageous effects in the cost reduction and reduction in man-hours.

As mentioned above, the embodiment of the present invention has been described. The present invention is not limited to the above-described embodiment, but may be appropriately modified without departure of the subject matter of the present invention. For example, the number of the welding spots (n being a natural number of three or more) at the planar part 24 may be three or more. When n welding spots are arranged in the planar part 24 in a front-rear direction of the vehicle V, the width w of the planar part 24 is desirable to satisfy the following equation:

$$w \approx n \cdot R_2$$

DESCRIPTION OF REFERENCE SYMBOLS

1 damper housing structure body
2 damper housing (damper housing structure body)
3 damper base (damper housing structure body)
21 inner side wall (inner wall)
22 front side wall (front wall)
24 planar part
51, 52 welding spot
51c, 52c welding margin
D damper

The invention claimed is:
1. A damper housing structure body comprising:
a damper housing configured to house a damper of a suspension device of a vehicle; and
a damper base, disposed at a top of the damper housing, fixed to the damper, wherein
an upper edge of the damper housing and the damper base are bonded by spot welding,
wherein the damper housing having a U-shape in a plan view thereof with an opening toward a vehicle outer side and including a planar part at a corner part between a front wall and an inner wall,
wherein the planar part includes a plurality of welding spots arranged in a vehicle front-rear direction,
wherein the welding spots adjoining each other have welding margins which are overlapped with each other, and
wherein one of the welding spots is formed by being welded while a current is applied to another one of the welding spots that has been already welded.
2. The damper housing structure body defined by claim 1, wherein a width of the planar part is substantially the same as a sum of outer diameters of a plurality of the welding spots.
3. The damper housing structure body defined by claim 1, wherein one of the welding spots if formed by welding using a current value higher than another current value used for welding another one of the welding spots that has been already welded.
4. A damper housing structure body comprising:
a damper housing configured to house a damper of a suspension device of a vehicle; and
a damper base, disposed at a top of the damper housing, fixed to the damper, wherein
an upper edge of the damper housing and the damper base are welded by spot welding,
wherein the damper housing having a U-shape in a plan view thereof with an opening toward a vehicle outer side and including a planar part at a corner part between a front wall and an inner wall,
wherein the planar part includes a plurality of welding spots arranged in a vehicle front-rear direction,
wherein the welding spots adjoining each other have welding margins, and an interval between two of the welding spots adjoining each other is shorter than an outer diameter of the welding margins, and
wherein one of the welding spots is formed by being welded while a current is applied to another one of the welding spots that has been already welded.
5. The a-damper housing structure body defined by claim 4, wherein a width of the planar part is substantially the same as a sum of outer diameters of a plurality of the welding spots.
6. The damper housing structure body defined by claim 4, wherein one of the welding spots if formed by welding using a current value higher than another current value used for welding another one of the welding spots that has been already welded.
7. A damper housing structure body comprising:
a damper housing configured to house a damper of a suspension device of a vehicle; and
a damper base, disposed at a top of the damper housing, fixed to the damper, wherein
an upper edge of the damper housing and the damper base are bonded by spot welding,
wherein the damper housing having a U-shape in a plan view thereof with an opening toward a vehicle outer side and including a planar part at a corner part between a front wall and an inner wall,
wherein the planar part includes a plurality of welding spots arranged in a vehicle front-rear direction,
wherein the welding spots adjoining each other have welding margins which are overlapped with each other, and
wherein one of the welding spots if formed by welding using a current value higher than another current value used for welding another one of the welding spots that has been already welded.
8. The damper housing structure body defined by claim 7, wherein a width of the planar part is substantially the same as a sum of outer diameters of a plurality of the welding spots.

9. A damper housing structure body comprising:
a damper housing configured to house a damper of a suspension device of a vehicle; and
a damper base, disposed at a top of the damper housing, fixed to the damper,
wherein an upper edge of the damper housing and the damper base are welded by spot welding,
wherein the damper housing having a U-shape in a plan view thereof with an opening toward a vehicle outer side and including a planar part at a corner part between a front wall and an inner wall, wherein the planar part includes a plurality of welding spots arranged in a vehicle front-rear direction,
wherein an interval between two of the welding spots adjoining each other is shorter than an outer diameter of the welding margins, and
wherein one of the welding spots if formed by welding using a current value higher than another current value used for welding another one of the welding spots that has been already welded.

10. The damper housing structure body defined by claim 9, wherein a width of the planar part is substantially the same as a sum of outer diameters of a plurality of the welding spots.

* * * * *